E. B. CLARK & R. J. BURROWS.
METAL WHEEL.
APPLICATION FILED JAN. 2, 1915.
1,246,052.
Patented Nov. 13, 1917.
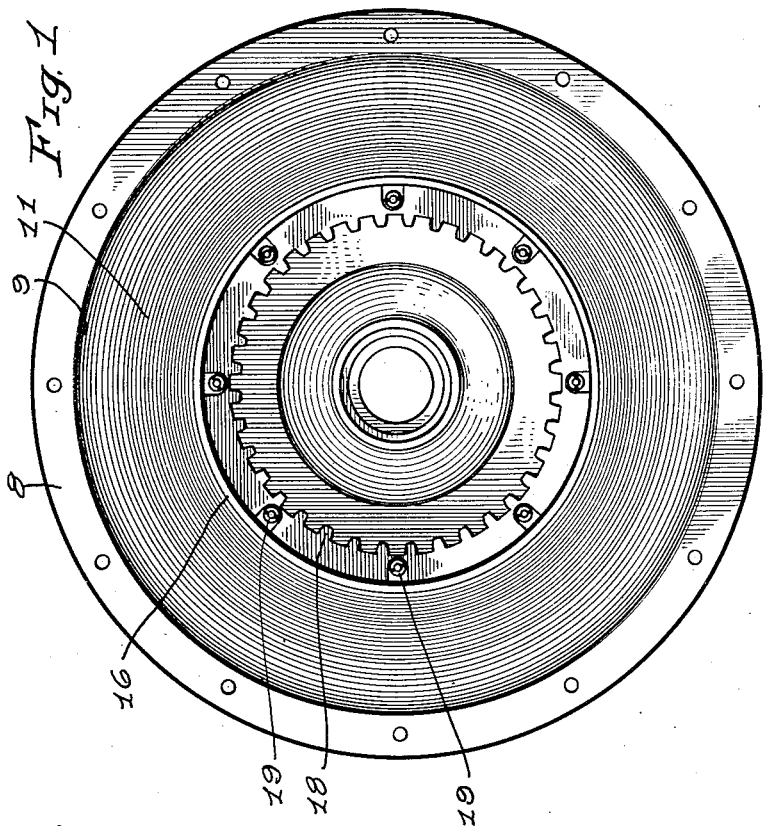
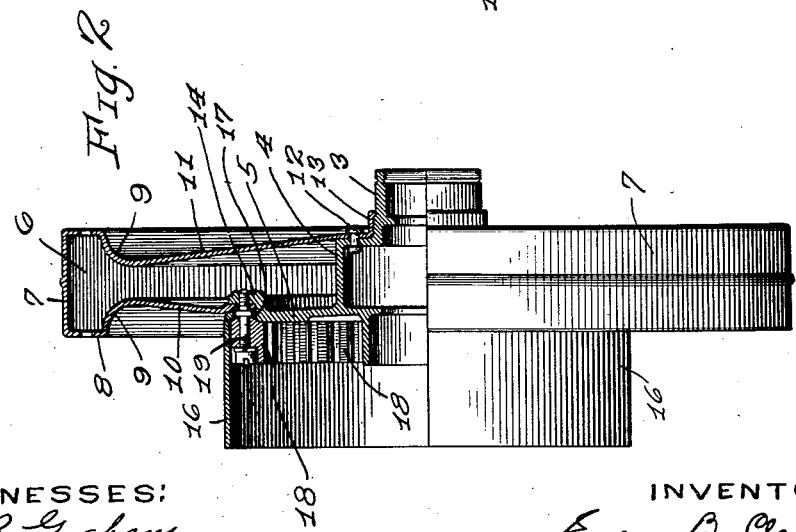
WITNESSES:
L. B. Graham
W. A. Furnner.
INVENTORS
Eugene B. Clark,
Robert J. Burrows,
Adams Jackson.
BY          ATT'YS.

UNITED STATES PATENT OFFICE.

EUGENE B. CLARK, OF CHICAGO, ILLINOIS, AND ROBERT J. BURROWS, OF BUCHANAN, MICHIGAN, ASSIGNORS, BY MESNE ASSIGNMENTS, TO CLARK EQUIPMENT COMPANY, OF BUCHANAN, MICHIGAN, A CORPORATION OF MICHIGAN.

METAL WHEEL.

1,246,052.     Specification of Letters Patent.     Patented Nov. 13, 1917.

Application filed January 2, 1915. Serial No. 240.

*To all whom it may concern:*

Be it known that we, EUGENE B. CLARK and ROBERT J. BURROWS, citizens of the United States, and residents, respectively, of Chicago, in the county of Cook and State of Illinois, and of Buchanan, in the county of Berrien and State of Michigan, have invented certain new and useful Improvements in Metal Wheels, of which the following is a specification, reference being had to the accompanying drawings.

Our invention relates to metal wheels of the type shown and described in our application for patent filed of even date herewith, Serial No. 239, in which the wheel is composed of a hub, and a box-like rim formed of pressed steel and connected with the hub by webs integral with the rim, the wheel being constructed by welding together the abutting rim portions of two similar oppositely-disposed pressed steel disks, which are welded to the hub at points a distance apart. Our present invention has to do with the application to a wheel of the type mentioned of a suitable brake-drum and driving gear so that the wheel may be used as one of the driving wheels of a motor truck.

In the accompanying drawings, in which we have illustrated one form in which our invention may be embodied,—

Figure 1 is an elevation of our improved wheel; and

Fig. 2 is a partial vertical cross-section thereof, the lower half of the wheel being in elevation.

Referring to the drawings,—

3 indicates the hub, which is best made of cast steel. The intermediate portion of the hub is made of somewhat greater diameter than the end portions thereof, as shown at 4 in Fig. 2, and at one side of such enlarged portion is provided a radial flange 5 the diameter of which is substantially equal to the diameter of the brake-drum hereinafter described. 6 indicates the rim of the wheel, which, as shown, is box like in cross-section, having a substantially flat tread 7, inwardly-projecting radial flanges 8 at the marginal portions of the tread, and oppositely-curved members 9 extending from the inner margins of the flanges 8 to and merging with webs 10—11, respectively. The web 11 extends inwardly toward the hub and bears against one end of the enlarged portion 4 of the hub, to which it is secured by rivets 12. Said web is also provided at its inner end with a flange 13 which bears upon the outer surface of the hub and is welded thereto. The web 10 extends to the outer portion of the flange 5, which is provided with an offset portion 14, thus providing a shoulder against which the inner margin of the web 10 bears. The inner portion of the web 10 is welded to the flange 5 so as to make a secure connection at that point also. 16 indicates the brake-drum, which is preferably made of pressed steel and is adapted to fit into the recess formed by the offset portion 14 of the flange 5, being provided with an inturned flange 17 which bears against the inner surface of the web 10. 18 indicates a gear ring, which fits within the brake-drum 16 and bears against the flange 17. 19 indicates one of the bolts by which the gear ring, the brake-drum and the web 10 are further secured together and to the flange 5. By this construction we secure the advantage of the use of light materials in making the tread portion of the wheel and the webs 10—11 and nevertheless provide a very strong support for the brake-drum and gear ring. Furthermore, the driving strain is applied close to the rim of the wheel and the driving is all done through solid steel members rather than through wooden spokes, as is the case where wooden wheels are used. It will be understood that the wheel is constructed by pressing the webs separately, each web carrying one-half the rim structure as an integral part of it, the abutting margins of the tread being welded together after the webs are assembled, thus integrally uniting the hub, webs and rim. A suitable tire is of course applied to the tread and may be secured in any suitable way. The resilient construction of the wheel makes it easy on tires, which is, of course, a very important advantage from an economical standpoint. If necessary, the gear ring 16 and brake-drum 18 may be removed by removing the bolts 19.

That which we claim as our invention, and desire to secure by Letters Patent, is—

1. A metal wheel composed of a hub having an intermediate portion of greater diameter than the end portions thereof and a radial flange at one side of such enlarged intermediate portion, an integral member comprising a rim portion box-like in cross-section, pressed steel webs extending independently of each other from said rim portion, one of said webs being secured against one end of said enlarged portion of the hub, the other of said webs being connected to said radial flange, and a brake-drum also secured to said radial flange.

2. A metal wheel composed of a hub having an intermediate portion of greater diameter than the end portions thereof and a radial flange at one side of such enlarged intermediate portion, an integral member comprising a rim portion box-like in cross-section, pressed steel webs extending independently of each other from said rim portion, one of said webs being secured against one end of said enlarged portion of the hub, the other of said webs being connected to said radial flange, and a brake-drum also secured to said radial flange, said brake-drum having an inturned flange at its inner margin which bears against said radial flange.

3. A metal wheel composed of a hub having an intermediate portion of greater diameter than the end portions thereof and a radial flange at one side of such enlarged intermediate portion, an integral member comprising a rim portion box-like in cross-section, pressed steel webs extending independently of each other from said rim portion, one of said webs being secured against one end of said enlarged portion of the hub, the other of said webs being connected to said radial flange, a brake-drum also secured to said radial flange, said brake-drum having an inturned flange at its inner margin which bears against said radial flange, and a gear-ring overlying said inturned flange and also secured to said radial flange.

4. A metal wheel composed of a hub having an intermediate portion of greater diameter than the end portions thereof and a radial flange at one side of such enlarged intermediate portion and having an offset portion in its outer margin, an integral member comprising a rim portion box-like in cross-section, pressed steel webs extending independently of each other from said rim portion, one of said webs being secured against one end of said enlarged portion of the hub, the other of said webs being connected with the offset portion of said radial flange, and a brake-drum having an inturned flange at its inner margin, said inturned flange being secured to the offset portion of said radial flange.

5. A metal wheel composed of a hub having an intermediate portion of greater diameter than the end portions thereof and a radial flange at one side of such enlarged intermediate portion and having an offset portion in its outer margin, an integral member comprising a rim portion box-like in cross-section, pressed steel webs extending independently of each other from said rim portion, one of said webs being secured against one end of said enlarged portion of the hub, the other of said webs being connected with the offset portion of said radial flange, a brake-drum having an inturned flange at its inner margin, said inturned flange being secured to the offset portion of said radial flange, and a gear-ring overlying said inturned flange and secured to said radial flange.

EUGENE B. CLARK.
ROBERT J. BURROWS.

Witnesses:
M. H. HAUTIRE,
K. E. WEHRLY.